Oct. 11, 1960
E. D. O'BRIAN ET AL
2,956,213
ELECTROLYTIC DEVICES
Filed Jan. 22, 1957
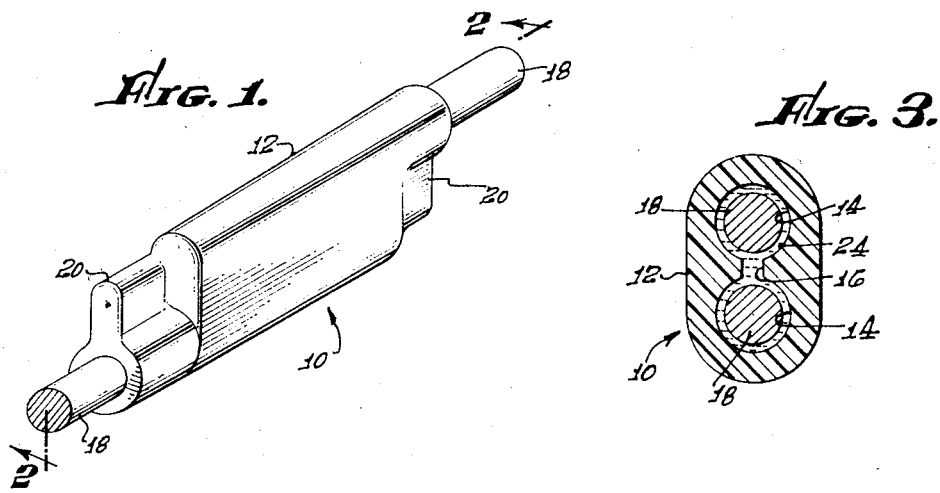
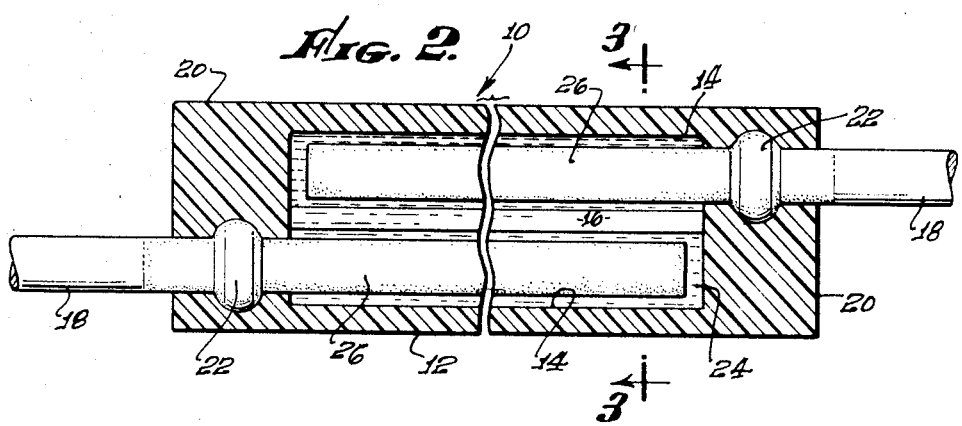
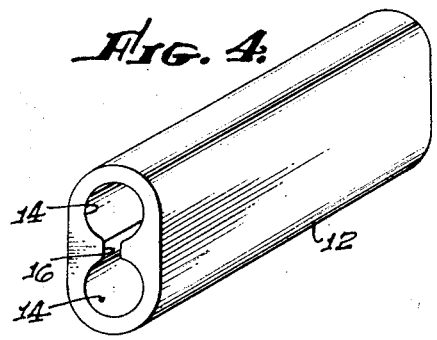
Edward D. O'Brian,
Robert E. O'Brian,
INVENTORS.

United States Patent Office 2,956,213
Patented Oct. 11, 1960

2,956,213

ELECTROLYTIC DEVICES

Edward D. O'Brian, 910 Iroquois Ave., Anaheim, Calif., and Robert E. O'Brian, 1754 Mar Ella Trail, Des Moines 10, Iowa Filed Jan. 22, 1957, Ser. No. 635,507

7 Claims. (Cl. 317—230)

This invention relates to new and improved electrolytic devices and more particularly to electrolytic capacitors.

Electrolytic capacitors are presently used for a wide variety of diverse military and commercial applications. The earliest electrolytic capacitors consisted essentially of two electrodes suspended in an electrolyte held within a glass or other similar vessel. As the use of electrolytic capacitors increased, various constructions were developed which utilized etched and oxidized aluminum foils wound together into a unit so as to be separated by an inert spacer. Such units were impregnated with an appropriate electrolyte after having been placed in a can. Of recent years a great deal of work has beeen done in developing electrolytic capacitors which may be used at high temperatures. The most well known of these high temperature units employs a sintered porous tantalum pellet which is used in conjunction wtih a silver or other inert metal can containing an electrolyte such as sulphuric acid.

Constructions of these categories while effective from an electrical point of view, are relatively expensive. Further, they are somewhat difficult to construct because of a variety of production problems, such as, for example, problems in sealing these capacitors. Practically all prior capacitor constructions have been vulnerable to the development of gases within these capacitors, such gases tending to cause in the housings employed a break, thus permitting the escape of electrolyte.

It is a broad object of the present invention to provide electrolytic devices which constitute an improvement over the aforegoing and other related types of electrolytic devices. A more specific object of this invention is to provide electrolytic capacitors which may be easily and conveniently manufactured at a comparatively low cost. Another related object of the invention is to provide electrolytic devices which are formed in such a manner as to be substantially immune from normal physical abuse such as rough handling. A still further object of the invention is to provide electrolytic devices which are substantially immune from damage caused in the internal formation of gas.

Further objects of this invention as well as many advantages of it will be fully apparent to those skilled in the art to which this invention pertains from a detailed consideration of the remainder of this description including the appended claims and the accompanying drawings in which:

Fig. 1 is a view in oblique projection of a complete electrolytic device of this invention;

Fig. 2 is a cross-sectional view taken at line 2—2 of Fig. 1;

Fig. 3 is a cross-sectional view taken at line 3—3 of Fig. 2; and

Fig. 4 is a view in oblique projection of a part employed in creating the electrolytic device shown in the preceding figures.

In all figures of the drawing, like numerals are used to designate like parts. It is to be understood that the accompanying drawing is primarily intended so as to illustrate the type of construction employed in a presently preferred embodiment of this invention. Because of this, this drawing is not to be taken as limiting the invention in any respect. Obviously those skilled in the art will be capable of designing a wide variety of differently appearing electrolytic devices which embody the features of this invention as set forth in the specification.

As an aid to understanding the invention, it may be stated that essentially in summary form it concerns electrolytic devices which are formed so as to include a housing of an inert thermoplastic material, this housing being shaped so as to have a retaining passage located therein, these retainer passages being connected by what may be termed a communicating passage. Within the construction of the invention, electrodes are positioned so as to extend into these retaining passages along the lengths thereof so as to be held in place apart from one another within these retaining passages. An electrolyte is positioned within the first passages indicated so as to interconnect the electrodes employed, and the housing itself is provided with at least one sealed portion which serves to hold the electrolye in position and to aid in holding the electrodes employed in place.

The actual details of this ivention may be easily understood by referring directly to the drawing. Here there is shown an electrolytic device 10 of the present invention which includes an elongated housing 12. The housing 12 is preferably formed of an inert thermoplastic material such as, for example, a polyolefin of which common, commercial polyethylene is a good example. The housing 12 may have been formed of other various related materials, such as, for example, various thermoplastic diisocyanate polymers such as are presently coming into common use. The material used so as to form the housing 12 should preferably be of a somewhat flexible and resilient character so as to permit deformation if gas bubbles develop within the complete device 10. When such materials are used for the housing 12 the device 10 is capable of withstanding considerable physical abuse inasmuch as it is not of a rigid character.

With the embodiment of this invention the housing 12 shown is formed by various extrusion or similar plastic forming techniques so as to have essentially a configuration as indicated in Fig. 4 of the drawing. Here it is shown that it has comparatively large diameter retaining passages 14 which are interconnected by a comparatively small communicating passage 16. The names given to these passages 14 and 16 are indicative as to part of their function with the complete device 10. The passage 16 prevents electrodes 18 from coming in contact with one another.

Within this construction electrodes 18 are held within each of the retaining passages 14 so as to extend along the lengths of each of these retaining passages and thence out through opposite ends 20 of the device 10. Preferably each electrode 18 slightly smaller than the passage 14 within which it is positioned is provided with an enlarged portion 22 in the nature of a projection which extends from the principal section of each of these electrodes. These portions 22 may be conveniently termed "projection means"; obviously these electrodes 18 may be bent, hammered or otherwise deformed so as to develop various types of other projections.

In one method of assembling the device 10 one of the electrodes 18 is first placed in a position as indicated in Fig. 2 of the drawing. At this time appropriately formed heated dies such as are commonly used to seal various thermoplastic resins are brought against both sides of the one of the ends 20 of the housing 12 adjacent to this electrode. Such dies cause the retaining passages 14 and 16 to be sealed and cause a part of the housing 12 to engage the large portion 22 of the particular electrode 18 involved so as to completely seal one end of the housing 12. It is to be noted that the enlarged portion 22 of the electrode 18 is held within the sealed area created so as to firmly hold the particular electrode 18 in such a manner that it cannot be pulled away from the housing 12.

The next step in this method of forming the device 10 is to locate the housing 12 so that the end 20 of the housing 12 which is open is at the top. An electrolyte 24 is then placed within the housing 12 so as to almost fill this housing. After this is done, the other electrode 18 is inserted to approximately the position shown in Fig. 2 and hot dies as indicated in the preceding discussion are brought against the upper end 20 of the housing 12 so as to completely seal this housing, anchoring the other electrode 18 in the same manner as the first electrode was secured.

It will be realized that the above assembly technique is extremely simple and that it may be carried out entirely by machine if desired. Those skilled in the art will realize that the entire device 10 may be easily manufactured at a comparatively low cost because of this, and because of the fact that only a limited number of comparatively inexpensive parts are employed.

It is noted that the electrodes 18 are, in the preferred form of the invention shown, short lengths of an appropriate wire and that the enlarged portions 22 are merely created by striking these wires with an appropriate tool. While a wide variety of different metals can be employed for the electrodes 18 it is normally preferred to form the electrolytic devices of this invention which are intended for use as electrolytic capacitors with at least one of the electrodes 18 being of a valve metal, such as an aluminum tantalum or the like. Obviously the electrodes 18 formed of such a valve-metal must be provided with an adherent oxide coating 26 by various procedures such as are well known. Prior to the formation the electrodes 18 can be etched in a known manner. Various sintered metal, twisted wire or similar electrodes can, of course, be employed. It is to be noted that the coatings 26 on the two electrodes 18 in the preferred embodiment shown extend along the length of these electrodes so as to project past the ends of the various passages within the device 10. If desired, one of the electrodes 18 for an electrolytic capacitor may be formed of any known inert material such as, for example, silver.

Virtually any known type of electrolyte can be employed in a device such as discussed above. Thus, sulphuric acid or other highly corrosive electrolytes can be employed. Because of the inert, flexible nature of the housing 12 there is substantially no danger of the electrolyte employed escaping from this housing and causing damage. If small gas bubbles form within the housing 12, or gas is inadvertently left within this housing as a result of manufacturing, this gas will not cause trouble because of the flexible character of the housing 12 employed. Those skilled in the art to which this invention pertains will realize that a choice of electrolytes or the choice of appropriate valve metals, or the choice so as to whether to use either one or two valve metal electrodes to use with the invention will depend primarily upon a desired commercial application.

For certain applications it may be desirable to anchor both ends of an electrode within the sealed ends of the housing employed. This may easily be done during the sealing operation previously described. While it is normally preferred to have the electrodes used with this invention project from opposite ends of a housing, obviously both electrodes can project from the same end of a housing although there is danger of the electrodes coming in contact with one another because of the extremely small sizes in which devices of the present invention can be manufactured. If desired, the portions of the electrodes designed to be engaged by the resin housing employed may be coated or adhesive treated so as to facilitate sealing.

Those skilled in the art to which this invention pertains will realize that the essential features of this invention can be adapted to a number of other electrolytic devices besides capacitors, although the invention itself is deemed to be primarily of value in the construction of electrolytic capacitors. They will further realize that the broad principles herein described can be applied to devices in which a housing is formed by sealing section of a flexible thermoplastic resin to an appropriate inert termianl board, such as, for example, a phenolic board as commercially employed in printed circuit work. Because of the fact that this invention is capable of considerable modification of this category, it is to be considered as being limited only by the appended claims forming a part of this disclosure.

We claim:

1. An electrolytic device which includes: an elongated housing formed of an inert, electrically non-conductive material so as to have sealed ends, parallel retaining passages located so as to extend between said ends and communicating passage means connecting said retaining passages between said ends; an electrode positioned within each of said retaining passages, each of said electrodes extending to the exterior of the housing and being sealed to an end of said housing so as to seal the interior of said housing, said communicating passage means holding said electrodes apart from one another; and an electrolyte electrically connecting said electrodes, said electrolyte being located within said retaining passages and said communicating passage means within said housing, said electrode and said housing being chemically inert with respect to said electrolyte.

2. An electrolytic device as defined in claim 1 wherein said electrodes each includes projection means and wherein said projection means are located within said sealed ends of said housing so as to firmly hold said electrodes in position with respect to said housing.

3. An electrolytic device as defined in claim 1 wherein said housing is formed of a thermoplastic material.

4. An electrolytic device as defined in claim 1 wherein said electrodes extend from opposite ends of said housing.

5. An electrolytic device as defined in claim 1 wherein at least one of said electrodes is formed of a valve metal having an adherent oxide layer formed thereon.

6. An electrolytic device which includes: an elongated housing formed of an inert, thermoplastic, electrically non-conductive material so as to have sealed ends, parallel retaining passages located so as to extend between said ends and communicating passage means connecting said retaining passages, said communicating passage means extending between said ends; an electrode positioned within each of said retaining passages, said electrodes extending to the exterior of said housing through opposite ends of said housing, said electrodes each being sealed to an end of said housing, said electrodes each being sealed to an end of said housing so as to seal said retaining passages and said communicating passage means in said housing, said communicating passage means being smaller than said retaining passages and said electrodes so as to hold said electrodes apart from one another, at least one of said electrodes being formed of a valve metal having an adherent oxide layer formed thereon, said layer covering all of one of said electrodes within the interior of said housing; and an electrolyte electrically connecting said electrodes, said electrolyte being located within said retaining passages and said communicating passage means within said housing, said electrodes, said housing and said oxide layer being chemically inert with respect to said electrolyte.

7. An electrolytic device as defined in claim 6 wherein said electrodes each includes projection means and wherein said projection means are sealed within said ends of said housing.

References Cited in the file of this patent

UNITED STATES PATENTS

| | | |
|---|---|---|
| 929,371 | Arsem | July 27, 1909 |
| 2,047,452 | Zahodiakin | July 14, 1936 |
| 2,050,062 | Mershon | Aug. 4, 1936 |
| 2,368,688 | Taylor | Feb. 6, 1945 |
| 2,724,076 | Torrisi | Nov. 15, 1955 |
| 2,743,399 | Bujan | Apr. 24, 1956 |